US 8,015,488 B2

(12) United States Patent
Yamakado

(10) Patent No.: US 8,015,488 B2
(45) Date of Patent: Sep. 6, 2011

(54) DOCUMENT EDIT DEVICE, PROGRAM AND COMPUTER-READABLE STORAGE MEDIUM

(75) Inventor: Hitoshi Yamakado, Hino (JP)

(73) Assignee: Seiko Epson Corporation (JP)

( * ) Notice: Subject to any disclaimer, the term of this patent is extended or adjusted under 35 U.S.C. 154(b) by 949 days.

(21) Appl. No.: 11/998,566

(22) Filed: Nov. 30, 2007

(65) Prior Publication Data

US 2008/0195939 A1 Aug. 14, 2008

(30) Foreign Application Priority Data

Feb. 14, 2007 (JP) ................................. 2007-033591

(51) Int. Cl.
*G06F 17/00* (2006.01)
(52) U.S. Cl. ....................................................... 715/273
(58) Field of Classification Search .................. 715/243, 715/244, 245, 246, 247, 252, 273
See application file for complete search history.

(56) References Cited

U.S. PATENT DOCUMENTS

| 7,707,495 B2 * | 4/2010 | Hosotsubo ..................... 715/243 |
| 2004/0070626 A1 * | 4/2004 | Matsumoto .................... 345/788 |
| 2005/0223320 A1 * | 10/2005 | Brintzenhofe et al. ......... 715/517 |
| 2006/0010375 A1 * | 1/2006 | Salesin et al. ................... 715/517 |
| 2006/0150092 A1 * | 7/2006 | Atkins ............................ 715/517 |
| 2006/0190808 A1 * | 8/2006 | Balthaser ..................... 715/500.1 |
| 2006/0259872 A1 | 11/2006 | Mullen et al. |
| 2006/0288278 A1 * | 12/2006 | Kobayashi .................... 715/523 |
| 2006/0288280 A1 * | 12/2006 | Makela ......................... 715/530 |
| 2008/0024501 A1 | 1/2008 | Yamakado et al. |
| 2008/0024502 A1 | 1/2008 | Nagahara et al. |

FOREIGN PATENT DOCUMENTS

| JP | 10-228511 | 8/1998 |
| JP | 2003-208629 | 7/2003 |
| JP | 2005-190099 | 7/2005 |
| JP | 2005-269562 | 9/2005 |
| JP | 2007-011547 | 1/2007 |
| JP | 3915813 | 2/2007 |
| JP | 2008-033892 | 2/2008 |
| JP | 2008-035745 | 2/2008 |
| JP | 2008-065587 | 3/2008 |

(Continued)

OTHER PUBLICATIONS

Rin, Yano, "Stylesheet design and pulling power Chapter 1 web layout design", web creators MDN corporation, Japan, Mar. 1, 2006, vol. 51, pp. 36-49 (in Japanese) with explanation of relevance in English.

(Continued)

*Primary Examiner* — Laurie Ries
(74) *Attorney, Agent, or Firm* — Harness, Dickey & Pierce, P.L.C.

(57) ABSTRACT

A document edit device includes: object obtaining unit configured to obtain an object; a calculating unit configured to calculate a golden division line, the golden division line being a line that divides at the golden ratio a distance between two reference lines, each reference line being determined on the basis of a target area in which the object is displayed; and an editing unit configured to edit a size of the object so that the object contacts two lines, the two lines being selected from among the calculated golden division line and the boundary of the target area.

16 Claims, 5 Drawing Sheets

FOREIGN PATENT DOCUMENTS

| | | |
|---|---|---|
| JP | 2008-140158 | 6/2008 |
| JP | 2008-141495 | 6/2008 |
| JP | 2008-141496 | 6/2008 |
| JP | 2008-186332 | 8/2008 |
| JP | 2008-191746 | 8/2008 |
| JP | 2008-197835 | 8/2008 |
| JP | 2008-198011 | 8/2008 |
| JP | 2008-204173 | 9/2008 |
| JP | 2008-204179 | 9/2008 |

OTHER PUBLICATIONS

Ch'ng, E., "Simulation of a Design Environment for Users to Incorporate Proportioning Systems Into Screen Design", Jan. 2002.

Ch'ng, E. et al., "A Dynamic Gridding System for Web Page Design Tools" pp. 138-142, Aug. 13-16, 2001.

Prybyl, R., "Photoshop Scripts-Golden Ratio Grid", Jul. 17, 2006.

\* cited by examiner

DOCUMENT EDIT DEVICE, PROGRAM AND COMPUTER-READABLE STORAGE MEDIUM

The entire disclosures of Japanese Patent Application No. 2007-033591 filed on Feb. 14, 2007 is expressly incorporated by reference herein.

BACKGROUND

1. Technical Field

The present invention relates to techniques for editing a document.

2. Related Art

Some techniques for editing an object such as an image or text are known. The size of an object affects visual beauty of the document. In related arts, the size of an object is determined by a user. For example, according to a known document edit software, the size of an object is predetermined by a template or determined by a user on the basis of his/her knowledge and experience.

According to the related art, to determine the size of an object appropriately, a user must have professional knowledge of design. If a user does not have the requisite knowledge, the user cannot determine the size of an object appropriately.

SUMMARY

On the contrary, the invention provides a technique that enables a user who does not have professional knowledge of design, to determine the size of an object appropriately.

According to an aspect of the invention, there is provided a document edit device, including: an object obtaining unit configured to obtain an object; a calculating unit configured to calculate a golden division line, the golden division line being a line that divides at the golden ratio a distance between two reference lines, each reference line being determined on the basis of a target area in which the object is displayed; and an editing unit configured to edit a size of the object so that the object contacts two lines, the two lines being selected from among the calculated golden division line and the boundary of the target area.

According to the document edit device, an object is edited on the basis of the golden division line.

It is preferable that the document edit device may further includes a storing unit configured to store a category of the object, wherein the editing unit is configured to edit the size of the object so that the object contacts two lines, the two lines being selected on the basis of the category stored in the storing unit.

It is preferable that the document edit device may further includes an identifying unit configured to identify a category of the object, wherein the editing unit is configured to edit the size of the object so that the object contacts two lines, the two lines being selected on the basis of the category identified by the identifying unit.

It is preferable that the two reference lines are two parallel lines of the boundary of the target area.

It is preferable that the calculating unit is configured to calculate at least two golden division lines, and the directions of the at least two golden division lines are different from each other.

It is preferable that the at least one of the two reference lines is a line that divides at a predetermined ratio, two lines of the boundary of the target area.

It is preferable that the predetermined ratio is 1:1.

It is preferable that the predetermined ratio is the golden ratio.

It is preferable that the editing unit is configured to edit the size of the object so that the difference of the size before and after editing is minimized.

According to another aspect of the invention, there is provided a program causing a computer device to execute a process, the process including: obtaining an object; calculating a golden division line, the golden division line being a line that divides at the golden ratio a distance between two reference lines, each reference line being determined on the basis of a target area in which the object is displayed; and editing a size of the object so that the object contacts two lines, the two lines being selected from among the calculated golden division line and the boundary of the target area.

According to another aspect of the invention, there is provided a computer-readable storage medium storing a program causing a computer device to execute a process, the process comprising: obtaining an object; calculating a golden division line, the golden division line being a line that divides at the golden ratio a distance between two reference lines, each reference line being determined on the basis of a target area in which the object is displayed; and editing a size of the object so that the object contacts two lines, the two lines being selected from among the calculated golden division line and the boundary of the target area.

BRIEF DESCRIPTION OF DRAWINGS

The invention will be described with reference to the accompanying drawings, wherein like numbers refer to like units.

DETAILED DESCRIPTION OF EXEMPLARY EMBODIMENTS

1. Configuration

Figure 1:
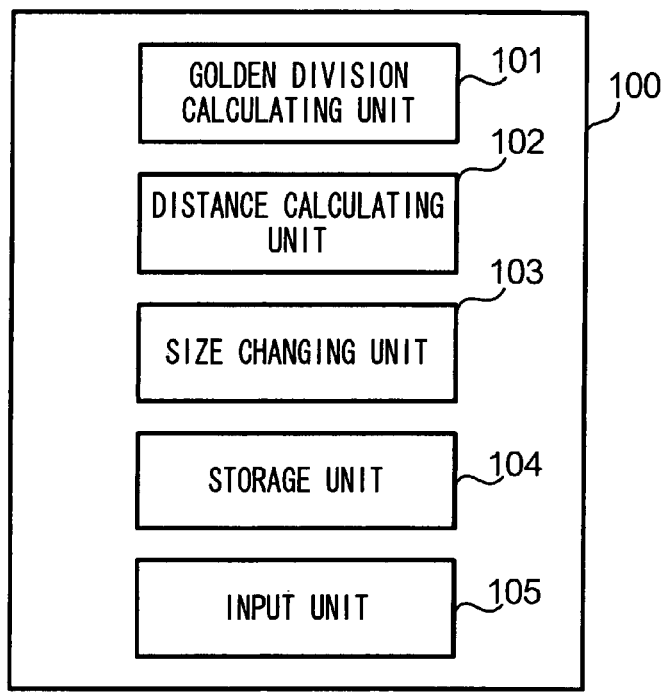
FIG. 1 shows a functional configuration of a document edit device 100 in accordance with one embodiment of the invention.

FIG. 1 shows a functional configuration of a document edit device 100 in accordance with one embodiment of the invention. The document edit device 100 has a function of supporting editing of a document as well as editing a document. Here, a term "document" refers to data showing at least one object laid-out in a layout area and layout information showing a layout of a document in the layout area, or a product outputted on the basis of the data. A term "object" refers to data showing at least one of a text (character strings) and an image, or a text or an image shown by the data. A term "layout area" refers to an area corresponding to a physical boundary of an outputted document. The layout area is, for example, one or plural sheets of paper, a page, plural continuous pages, or a part of a page.

A golden division calculating unit 101 calculates a golden division line, which is a line dividing at the golden ratio a distance between two reference lines. A distance calculating unit 102 calculates a distance between two lines. Each line is selected from among the calculated golden division line and the boundary of the target area. A size changing unit 103 changes the size of an object in response to a distance between two lines. A storage unit 104 stores category of an object. An input unit 105 receives an input from a user and outputs a signal showing the input. It is to be noted that the golden ratio is expressed by the equation (1) shown below. In equation (1), the right term and the left term may be exchanged with each other.

$$1:\frac{1+\sqrt{5}}{2} \qquad (1)$$

Figure 2:
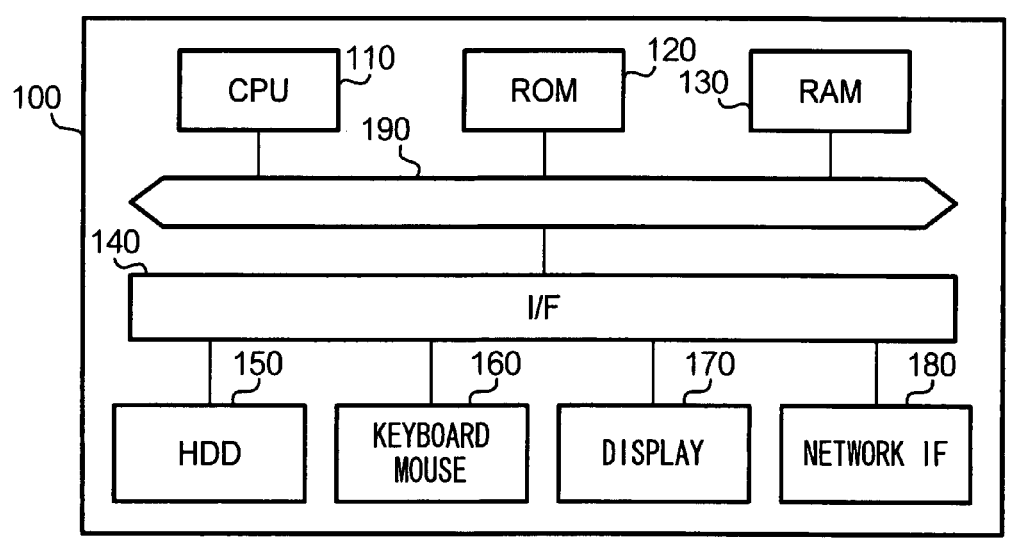
FIG. 2 shows a hardware configuration of the document edit device 100.

FIG. 2 shows a hardware configuration of the document edit device 100. A CPU (Central Processing Unit) 110 is a control device that controls an element of the document edit device 100. A ROM (Read Only Memory) 120 is a storage device that stores a program and data used to boot the document edit device 100. A RAM (random access memory) 130 is a storage device that functions as a work area when the CPU 110 executes a program. An I/F 140 is an interface that inputs/outputs data or a signal from/to an input device, an output device, or a storage device. A HDD (Hard Disk Drive) 150 is a storage device that stores various programs and data. In the present embodiment, the HDD 150 stores a document edit program that generates a golden division line. A keyboard/mouse 160 is an input device by which a user inputs an instruction to the document edit device 100. A display 170 is an output device that displays content of data and information relating to a processing. In the present embodiment, the display 170 displays an object, a layout area, and a grid line. A network IF 180 is an interface used to communicate data with another device connected via a network (not shown in the figures). The document edit device 100 may receive a document (more specifically, data showing the document) via the network and the network IF 180. The CPU 110, ROM 120, RAM 130 and I/F 140 are connected via a bus 190 to each other. The document edit device 100 has the functions shown in FIG. 1 by the CPU 110 executing the document edit program. It is to be noted that the document edit device 100 may be any kind of a device as long as the device has the functional configuration shown in FIG. 1 and the hardware configuration shown in FIG. 2. For, example, the document edit device 100 may be a personal computer. Alternatively, the document edit device 100 may be an image forming device such as a printer.

2. Operation

Figure 3:
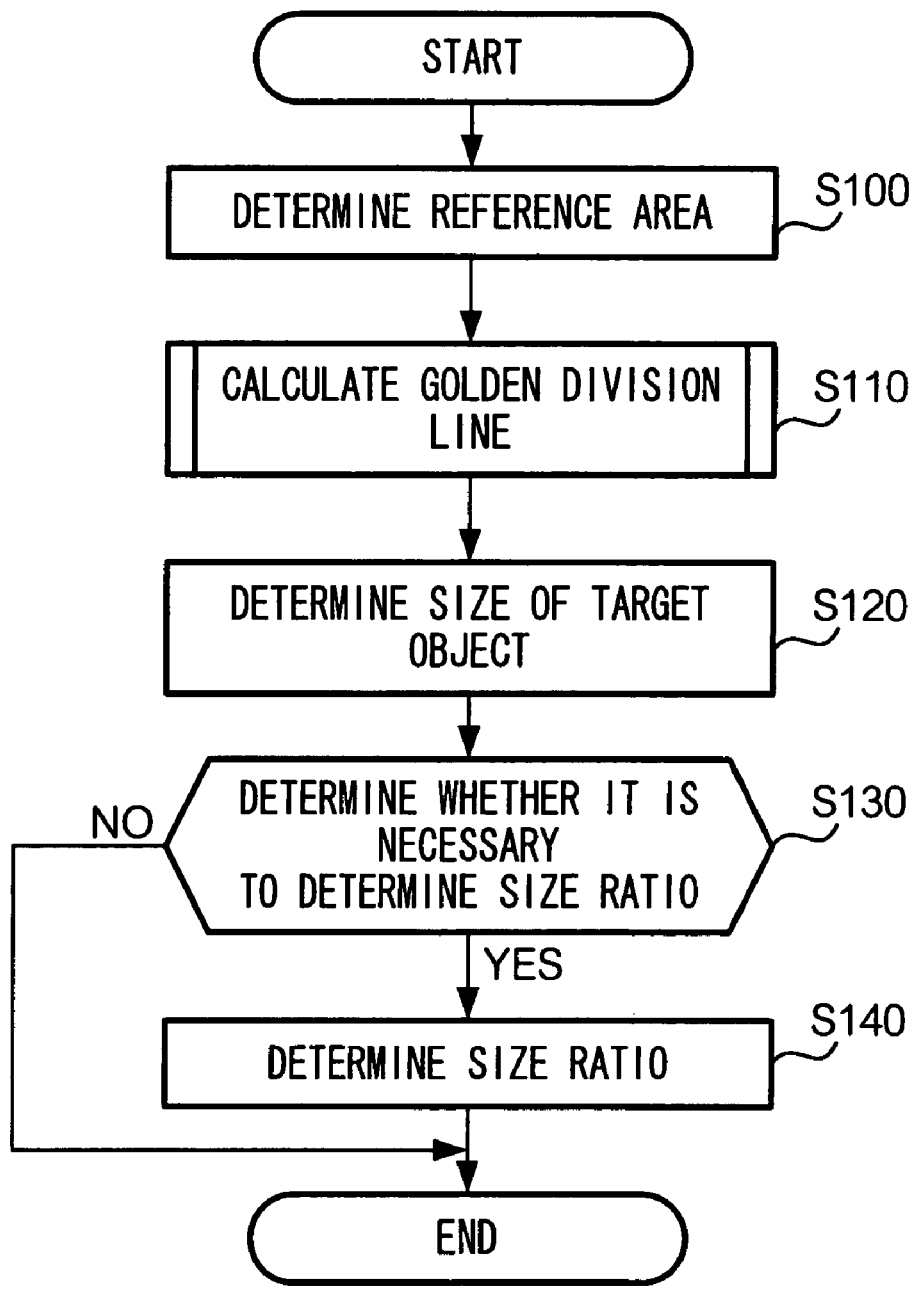
FIG. 3 shows a flowchart illustrating an operation of the document edit device 100.

FIG. 3 shows a flowchart illustrating an operation of the document edit device 100. Prior to the flow shown in FIG. 3, the document edit device 100 obtains a document which is a target to be edited. The document may be obtained through any path. For example, the document edit device 100 may obtain the document from the HDD 150. Alternatively, the document edit device 100 may obtain the document via a network (not shown in the figures) and the network IF 180. Further alternatively, the document edit device 100 may obtain the document via the keyboard/mouse 160 operated by a user.

The CPU 110 determines an object as a target to be edited. The target object may be determined automatically in accordance with a predetermined algorithm, or manually in accordance with an input by a user. The CPU 110 determines a part, based on which the size of an object is changed. Here, description is given for an example in which the size is changed based on a width (a length of horizontal direction) of the target object. The part may be determined automatically in accordance with a predetermined algorithm, or manually in accordance with an input by a user.

In step S100, the CPU 110 determines a reference area, which is an area based on which the size of an object is determined. The reference area is, for example, a layout area, in other words, a page or a type page. Alternatively, the reference area may be a part of the layout area, for example, an area defined by an object.

In step S110, the CPU 110 calculates a golden division line. In other words, the CPU 110 determines a line used for the size changing process. The details of the process will be described later. In step S120, the CPU 110 determines the size of the object on the basis of the calculated golden division line. The details of the process will be described later. In step S130, the CPU 110 determines whether it is necessary to determine a size ratio. Here, the term "size ratio" refers to an aspect ratio of an object. If it is determined that it is not necessary to determine the size ratio (S130: NO), the CPU 110 terminates the operation shown in FIG. 3. If it is determined that it is necessary to determine the size ratio (S130: YES), the CPU 110 determines the size ratio.

Figure 4:
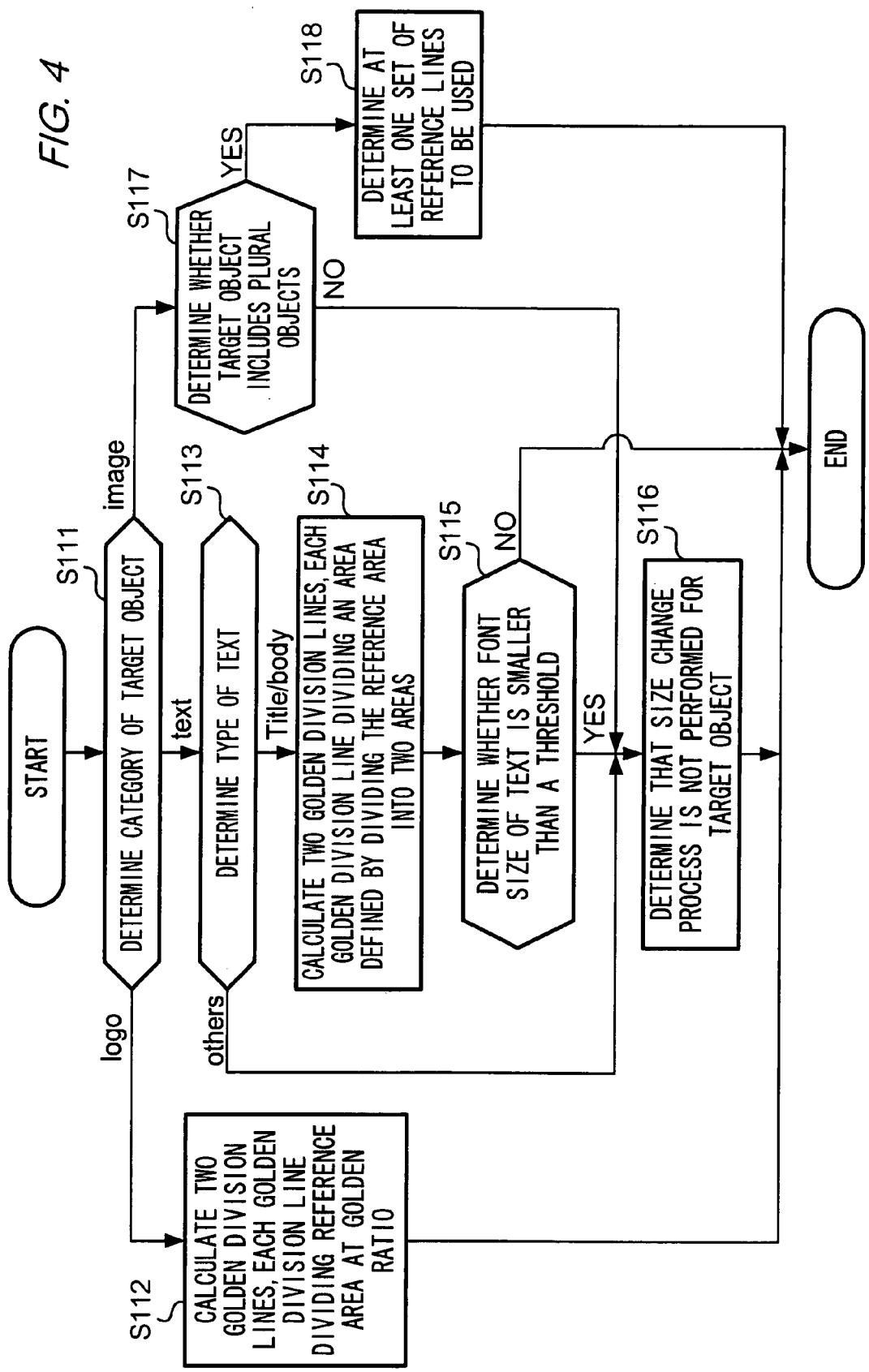
FIG. 4 shows a flowchart illustrating a golden division line calculating process.

FIG. 4 shows a flowchart illustrating a golden division line calculating process in step S110. In step S111, the CPU 110 determines a category of the target object. The CPU 110 determines the category on the basis of attribute information. In this case, the document includes attribute information showing the category of an object. Alternatively, the CPU 110 determines the category on the basis of an input by a user.

Here, the description is given for an example in which a category of an object is one of "logo", "text" and "image". If it is determined that the category of the object is "logo" (S111: LOGO), the CPU 110 proceeds to the operation in step S112. If it is determined that the category of the object is "text" (S111: TEXT), the CPU 110 proceeds to the operation in step S113. If it is determined that the category of the object is "image" (S111: IMAGE), the CPU 110 proceeds to the operation in step S117.

In step S112, the CPU 110 calculates two golden division lines, each golden division line dividing the reference area at the golden ratio. First, the CPU 110 determines the right side and the left side of the reference area as the reference lines. The CPU 110 calculates two golden division lines, each golden division line dividing the distance between the two reference lines at the golden ratio. One of the two golden division lines is a line dividing the distance at $$1:\frac{1+\sqrt{5}}{2},$$

the other is a line dividing the distance at $$\frac{1+\sqrt{5}}{2}:1.$$

The CPU 110 determines to use these two golden division lines for the size change.

In step S113, the CPU 11o determines a type of text. The CPU 110 determines the type of text on the basis of the attribute information. In this case, the attribute information includes the type of the text. Alternatively, the CPU 110 may determine the type of text on the basis of input by a user. Here, the description is given for an example in which type of a text is one of "title", "body" and "others". If it is determined that the type of the text is "title" or "body" (S113: TITLE/BODY), the CPU 110 proceeds to the operation in step S114. If it is determined that the type of the text is "others" (S113: OTHERS), the CPU 110 proceeds to the operation in step S116.

In step S114, the CPU 110 calculates two golden division lines, each golden division line dividing an area defined by dividing the reference area into two areas. The two golden division lines are two outer most lines from among candidate lines for golden division lines. First, the CPU 110 determines the left side and a center line of the reference area as two reference lines. Here, the "center line" is a line that divides the distance between the left side and the right side of the reference area at 1:1. The CPU 110 calculates as one of the two golden division lines a line dividing the distance between the two reference lines at $$1 : \frac{1+\sqrt{5}}{2}.$$

Then, the CPU 110 determines the center line and the right line of the reference area as two new reference lines. The CPU 110 calculates as one of the two golden division lines a line dividing the distance between the two reference lines at $$\frac{1+\sqrt{5}}{2} : 1.$$

Alternatively, the CPU 110 may calculate four candidate lines for the two golden division lines. Two candidate lines are generated from a set of reference lines. In all, four candidate lines are generated from two sets of reference lines. The CPU 110 selects two outer most lines from among candidate lines for golden division lines as the two golden division lines.

In step S115, the CPU 110 determines whether the font size of the text is smaller than a threshold. If it is determined that the font size is smaller than the threshold (S115: YES), the CPU 110 proceeds to the operation in step S116. If it is determined that the font size is not smaller than the threshold (S115: YES), the CPU 110 terminates the operation shown in FIG. 4. In a case that the size of the object is larger than a size defined by the golden division lines, it is necessary to reduce the size of the object. There is a possibility that it is necessary to change the font size in response to the reduction rate. Too much reduction of the font size may impair visual beauty of the document. Therefore, the size may not be changed in such a case. It is to be noted that the threshold may be predetermined. Alternatively, the threshold may be determined in response to the type of the document. Further alternatively, the threshold may be determined on the basis of a ratio of font size before and after the size change.

In step S116, the CPU 110 determines that the size change process is not performed for the target object. The CPU 110 stores in the RAM 130 a flag showing that the size change process is not performed.

In step S117, the CPU 110 determines whether the target object includes plural objects. If it is determined that the target object does not include plural objects (S117: NO), the CPU 110 proceeds to the operation of step S116. If it is determined that the target object includes plural objects (S117: YES), the CPU 110 proceeds to the operation of step S118.

In step S118, the CPU 110 determines at least one set of reference lines to be used, from among the right and left side, and the upper and lower side. The CPU 110 calculates two golden division lines for a set of reference lines. The CPU 110 selects two lines to be used for the size change process, from among these golden division lines and boundaries of the reference area.

The process of step S120 is again described referring to FIG. 3. The CPU 110 determines the size (in this case, width) of the target object so that the size is approximately equal to the distance between the two lines to be used for the size change process. If it is determined that the size change process on the basis of the golden division lines is not performed in step S116 (FIG. 4), the CPU performs another size change process according to another algorithm. The other algorithm is, in a case that the target object is text, for example, an algorithm to determine the size of the target object on the basis of the initial (or before the change) font size or font type. Alternatively, another algorithm is, in a case that the target object is text, for example, an algorithm to determine the size of the target object on the basis of a ratio of the object size to the size of page or type page.

The determination in step S130 is made, for example, on the basis of the number of objects included in the document. The CPU 110 may determine that it is necessary to determine the size ratio if the document includes plural objects. Alternatively, the CPU 110 may determine that it is necessary to determine the size ratio if the document includes plural objects having the same category. Further alternatively, the CPU 110 may determine that it is necessary to determine the size ratio on the basis of an attribute of the object. Further alternatively, the CPU 110 may determine that it is necessary to determine the size ratio on the basis of an input by a user.

The size change process in step S140 is performed as follows, for example. If there are two objects whose sizes are to be changed, the sizes of the objects are determined so that a size ratio (ratio of area, width or height) of an object located nearest to the center of the layout area to an object located in the outer part is approximately $$\frac{1+\sqrt{5}}{2} : 1.$$

If there are three or more objects whose sizes are to be changed, the sizes of two adjacent objects are determined so that a size ratio of an object located nearest to the center of the layout area to an object located in the outer part is approximately $$\frac{1+\sqrt{5}}{2} : 1.$$

Alternatively, the sizes of the three or more objects are determined so that a size ratio (ratio of area, width or height) of an object located nearest to the center of the layout area to an object located in the outer part is approximately $$\frac{1+\sqrt{5}}{2}:1.$$

The CPU 110 updates the document including an object whose size is changed (or determined) as described above. The CPU 110 may display on the display 170 the updated document. Alternatively, the CPU 110 may store in the HDD 150 the updated document. Further alternatively, the CPU 110 may transmit to another device the updated document.

3. Examples of Processed Documents

Figure 5:
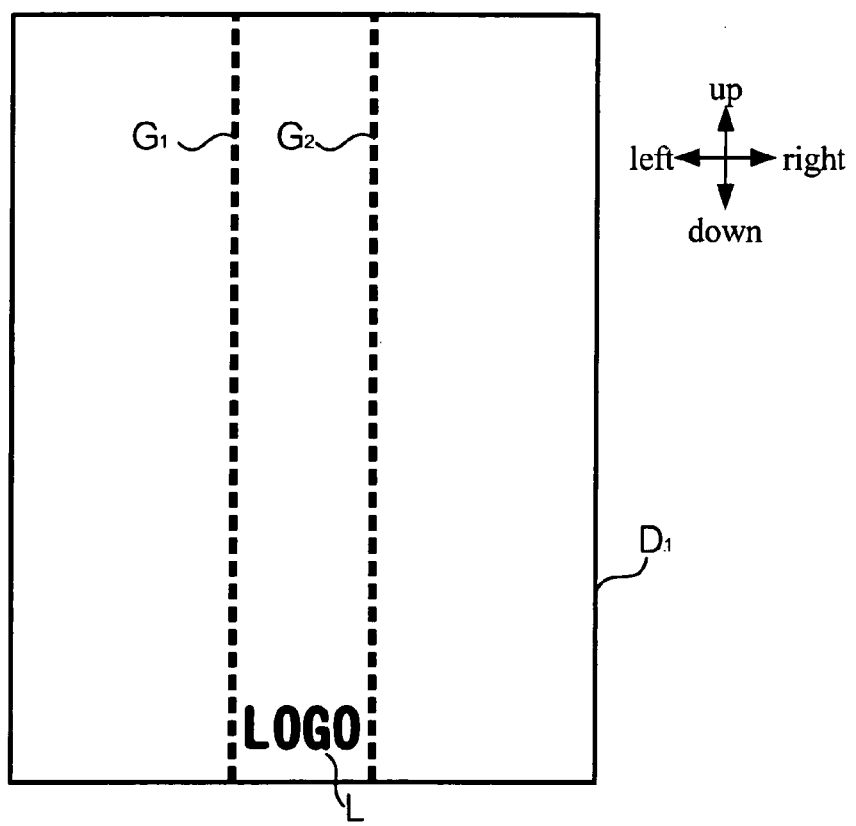
FIG. 5 shows an example of a processed document.

FIG. 5 shows an example of a processed document. In FIG. 5, the category of the target object is "logo". Golden division lines $G_1$ and $G_2$ are lines that divide at the golden ratio the distance between the left and right sides of a page (the layout area) of a document $D_1$. The size of a logo L is determined so that the width of the logo L is approximately equal to the golden division lines $G_1$ and $G_2$.

Figure 6:
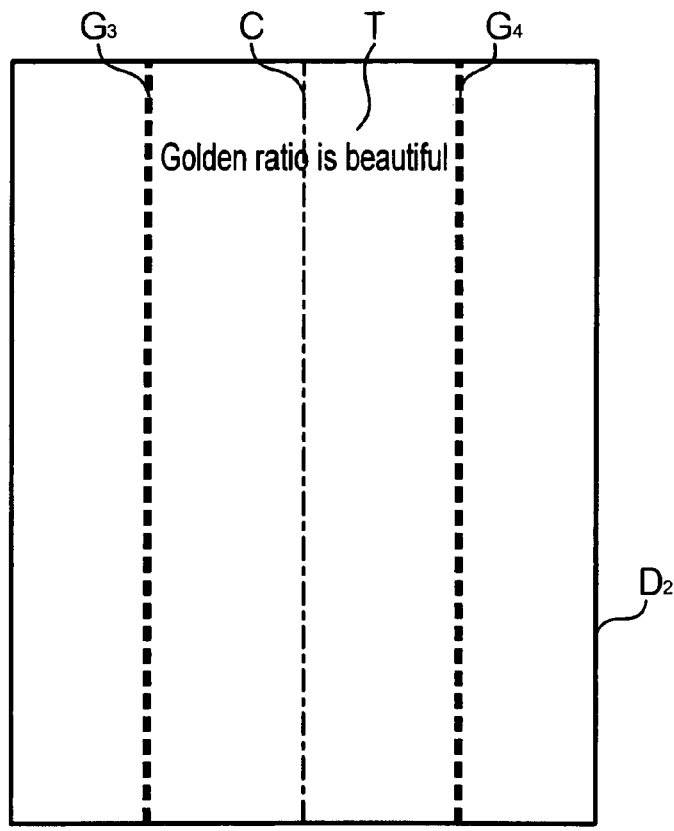
FIG. 6 shows another example of a processed document.

FIG. 6 shows another example of a processed document. In FIG. 6, the category of the target object is "text". A golden division line $G_3$ is a line that divides the distance between the left side and a center line C of the layout area of a document $D_2$. A golden division line $G_4$ is a line that divides the distance between the right side and the center line C of the layout area of the document $D_2$. The size of a text T is determined so that the width of the text T is approximately equal to the golden division lines $G_3$ and $G_4$.

Figure 7:
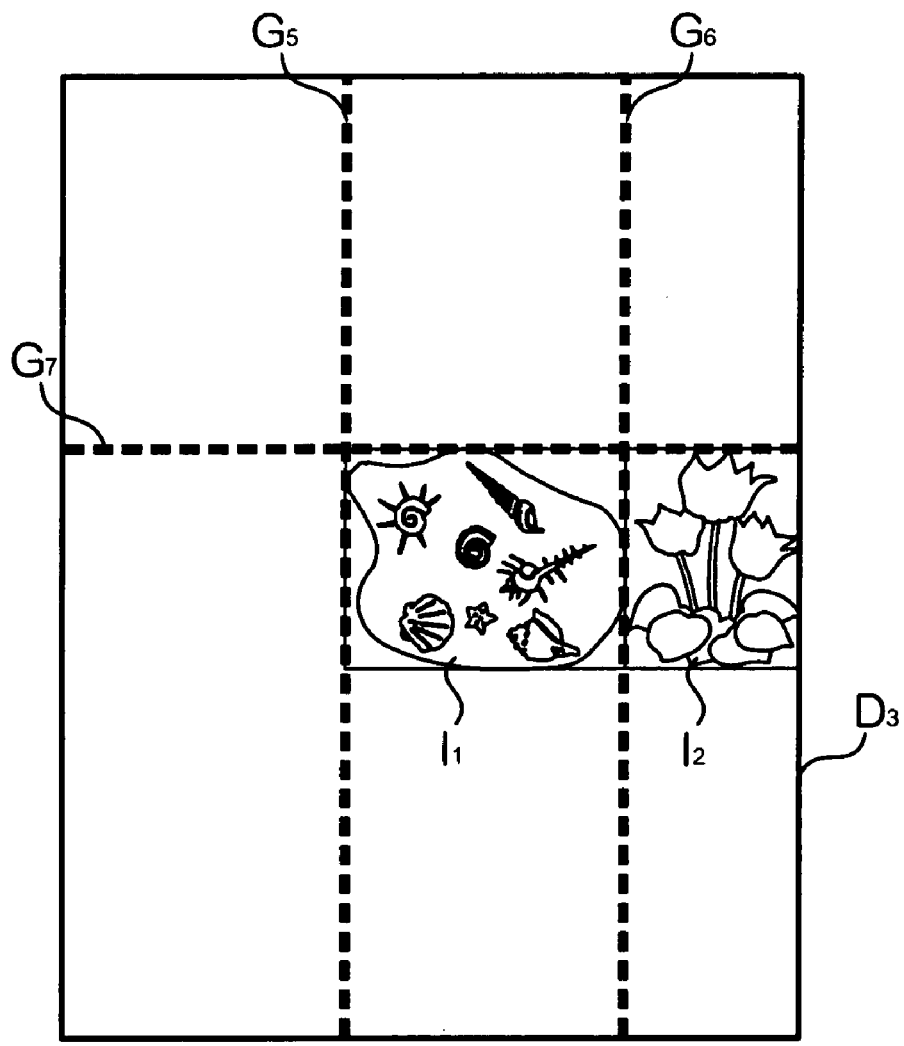
FIG. 7 shows yet another example of a processed document.

FIG. 7 shows yet another example of a processed document. In FIG. 7, the category of the target objects is "image". A golden division line $G_5$ is a line that divides a distance between the right and left sides of a layout area of a document $D_3$. A golden division line $G_6$ is a line that divides the distance between the golden division line $G_5$ and the right side of the layout area. In FIG. 7, the sizes of images $I_1$ and $I_2$ are determined so that the size (width) ratio of the image $I_1$, a target object nearest to the center of the layout area, to the image $I_2$, another target object located in the outer part, is approximately the golden ratio.

As described above, the size of the object is determined on the basis of the golden division, in other words, the golden ratio. Therefore, a user can make a well-balanced, beautiful document even if he/she has no knowledge and experience of design.

4. Further Embodiments

The invention is not limited to the above embodiments and may be practiced in various modifications.

In FIG. 4, some combinations of category and size determination process are described. However, the combination is not restricted to the example shown in FIG. 4. The two lines used to determine the size of the object may be selected from among (i) boundary of the layout area, (ii) a golden division line that divides at the golden ratio the distance between two lines selected from the boundary, and (iii) a golden division line that divides at the golden ratio the distance between two lines selected from the boundary or already existing golden division lines. Any combination of lines may be employed as reference lines.

The combination of lines used as reference lines may be determined in response to the category of the object, as described above. Alternatively, the combination of lines used as reference lines may be determined regardless of the category of the object. In other words, at least one process in FIG. 4 may be omitted. Further alternatively, the combination of lines used as reference lines may be determined on the basis of an attribute of the object. In this case, the document includes an attribute of an object. Further alternatively, the combination of lines used as reference lines may be determined at random.

In the embodiment above, width of the object is used as a size to be determined. However, the size to be determined may be according to any kind of parameter relating to a size of an object such as width, height, or area. In addition, plural golden division lines having different directions, for example, vertical and horizontal, may be used to determine the size of an object.

In addition, a program causing a computer device to execute the above described process may be provided with a computer-readable storage medium such as a CD-ROM (Compact Disk Read Only Memory).

What is claimed is:

1. A document edit device, comprising:
an object obtaining unit configured to obtain an object;
a calculating unit configured to calculate a golden division line, the golden division line being a line that divides at the golden ratio a distance between two reference lines, each reference line being determined on the basis of a target area in which the object is displayed;
an editing unit configured to edit a size of the object so that the object contacts two lines, the two lines being selected from among the calculated golden division line and the boundary of the target area; and
a storing unit configured to store a category of the object,
wherein the editing unit is configured to edit the size of the object so that the object contacts two lines, the two lines being selected on the basis of the category stored in the storing unit.

2. The document edit device according to claim 1,
wherein the two reference lines are two parallel lines of the boundary of the target area.

3. The document edit device according to claim 1, wherein the calculating unit is configured to calculate at least two golden division lines, and
the directions of the at least two golden division lines are different from each other.

4. The document edit device according to claim 1, wherein the at least one of the two reference lines is a line that divides at a predetermined ratio, two lines of the boundary of the target area.

5. The document edit device according to claim 4, wherein the predetermined ratio is 1:1.

6. The document edit device according to claim 4, wherein the predetermined ratio is the golden ratio.

7. The document edit device according to claim 1, wherein the editing unit is configured to edit the size of the object so that the difference of the size before and after editing is minimized.

8. A document edit device, comprising:
an object obtaining unit configured to obtain an object;
a calculating unit configured to calculate a golden division line, the golden division line being a line that divides at the golden ratio a distance between two reference lines, each reference line being determined on the basis of a target area in which the object is displayed; and
an editing unit configured to edit a size of the object so that the object contacts two lines, the two lines being selected from among the calculated golden division line and the boundary of the target area; and
an identifying unit configured to identify a category of the object, wherein the editing unit is configured to edit the size of the object so that the object contacts two lines, the two lines being selected on the basis of the category identified by the identifying unit.

9. The document edit device according to claim 8, wherein the two reference lines are two parallel lines of the boundary of the target area.

10. The document edit device according to claim 8, wherein
the calculating unit is configured to calculate at least two golden division lines, and
the directions of the at least two golden division lines are different from each other.

11. The document edit device according to claim 8, wherein
the at least one of the two reference lines is a line that divides at a predetermined ratio, two lines of the boundary of the target area.

12. The document edit device according to claim 11, wherein the predetermined ratio is 1:1.

13. The document edit device according to claim 11, wherein the predetermined ratio is the golden ratio.

14. The document edit device according to claim 8, wherein
the editing unit is configured to edit the size of the object so that the difference of the size before and after editing is minimized.

15. A computer-readable storage medium storing a program causing a computer device having a processor and a memory to execute a process, the process comprising:
storing, in the memory, a category of the object,
obtaining, by the processor, an object;
calculating, by the processor, a golden division line, the golden division line being a line that divides at the golden ratio a distance between two reference lines, each reference line being determined on the basis of a target area in which the object is displayed; and
editing, by the processor, a size of the object so that the object contacts two lines, the two lines being selected from among the calculated golden division line and the boundary of the target area, the size of the object being edited so that the object contacts two lines, the two lines being selected on the basis of the category stored in memory.

16. A computer-readable storage medium storing a program causing a computer device having a processor and a memory to execute a process, the process comprising:
storing, in the memory, a category of the object,
obtaining, by the processor, an object;
calculating, by the processor, a golden division line, the golden division line being a line that divides at the golden ratio a distance between two reference lines, each reference line being determined on the basis of a target area in which the object is displayed; and
editing, by the processor, a size of the object so that the object contacts two lines, the two lines being selected from among the calculated golden division line and the boundary of the target area, the size of the object so that the object contacts two lines, the two lines being selected on the basis of the category stored in the memory.

* * * * *